US011803580B2

(12) United States Patent
Cho et al.

(10) Patent No.: US 11,803,580 B2
(45) Date of Patent: Oct. 31, 2023

(54) APPARATUS AND METHOD FOR MACHINE-LEARNING-BASED POSITIONING DATABASE CREATION AND POSITIONING OF UNCOLLECTED POINTS USING MATCHING FEATURE WITH WIRELESS COMMUNICATION INFRASTRUCTURE

(71) Applicant: ELECTRONICS AND TELECOMMUNICATIONS RESEARCH INSTITUTE, Daejeon (KR)

(72) Inventors: Young-Su Cho, Daejeon (KR); Ju-Il Jeon, Sejong-si (KR); Myung-In Ji, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 79 days.

(21) Appl. No.: 17/529,939

(22) Filed: Nov. 18, 2021

(65) Prior Publication Data
US 2022/0374458 A1    Nov. 24, 2022

(30) Foreign Application Priority Data

May 4, 2021    (KR) .................... 10-2021-0057789

(51) Int. Cl.
*G06F 16/00*    (2019.01)
*G06F 16/33*    (2019.01)
(Continued)

(52) U.S. Cl.
CPC ........... *G06F 16/334* (2019.01); *G06N 20/00* (2019.01); *H04W 4/029* (2018.02)

(58) Field of Classification Search
CPC ...... G06F 16/334; G06N 20/00; G06N 20/10; H04W 4/029; H04W 64/00; G01S 5/0278; G01S 5/0252
See application file for complete search history.

(56) References Cited

U.S. PATENT DOCUMENTS

| 7,564,377 B2 * | 7/2009 | Kimchi .............. H04L 67/1001 340/995.13 |
| 10,237,845 B2 | 3/2019 | Youssef et al. |

(Continued)

FOREIGN PATENT DOCUMENTS

| KR | 10-2004-0028068 | 4/2004 |
| KR | 10-2009-0090849 | 8/2009 |
| KR | 10-2019-0111587 | 10/2019 |

*Primary Examiner* — Noosha Arjomandi
(74) *Attorney, Agent, or Firm* — KILE PARK REED & HOUTTEMAN PLLC

(57) ABSTRACT

Disclosed herein are an apparatus and method for positioning of uncollected points based on machine learning using matching wireless communication infrastructure points. The apparatus includes memory in which at least one program according to an embodiment is recorded and a processor for executing the program. The program may compare collected data acquired from wireless communication infrastructure with positioning data measured by a positioning target terminal and thereby extract matching feature points; create a fingerprint database of global grid cells, including uncollected points, for the extracted feature points in real time; and estimate the optimal composite location of the positioning target terminal based on the created fingerprint database.

17 Claims, 8 Drawing Sheets

(51) Int. Cl.
    *G06N 20/00*       (2019.01)
    *H04W 4/029*     (2018.01)

(56) References Cited

U.S. PATENT DOCUMENTS

| | | | | |
|---|---|---|---|---|
| 10,271,179 | B1* | 4/2019 | Shima | G06N 3/08 |
| 10,383,086 | B2* | 8/2019 | Chan | H04W 24/02 |
| 10,422,854 | B1* | 9/2019 | Huberman | G01S 11/06 |
| 10,966,055 | B1* | 3/2021 | Ibrahim | G01S 5/0221 |
| 11,381,743 | B1* | 7/2022 | Mahbub | H04N 23/65 |
| 2016/0005229 | A1* | 1/2016 | Lee | G06T 11/60 |
| | | | | 345/419 |
| 2016/0047890 | A1* | 2/2016 | Ryan | H04W 4/02 |
| | | | | 398/118 |
| 2016/0094951 | A1* | 3/2016 | Yang | H04W 4/029 |
| | | | | 455/456.1 |
| 2016/0094954 | A1* | 3/2016 | Millman | H04W 4/80 |
| | | | | 455/456.2 |
| 2017/0201865 | A1 | 7/2017 | Cho et al. | |
| 2017/0374518 | A1* | 12/2017 | Brunner | G01S 19/47 |
| 2018/0041985 | A1* | 2/2018 | Davaadorj | H04W 64/003 |
| 2019/0266404 | A1* | 8/2019 | Spivack | G06V 20/35 |
| 2020/0019580 | A1* | 1/2020 | Kim | G06F 16/2379 |
| 2020/0142045 | A1* | 5/2020 | Yang | G01S 5/0252 |
| 2020/0304953 | A1* | 9/2020 | Georgy | H04W 4/026 |
| 2020/0305111 | A1* | 9/2020 | Kuang | G01S 5/0252 |
| 2021/0329416 | A1* | 10/2021 | Li | H04B 17/318 |
| 2022/0053285 | A1* | 2/2022 | Shu | H04W 4/023 |
| 2022/0171820 | A1* | 6/2022 | Neun | G06F 16/9537 |
| 2022/0337972 | A1* | 10/2022 | Karmanov | H04W 4/029 |
| 2022/0349978 | A1* | 11/2022 | Baek | H04W 4/02 |
| 2022/0374458 | A1* | 11/2022 | Cho | G06F 16/334 |
| 2023/0066501 | A1* | 3/2023 | Jonietz | G06N 20/00 |
| 2023/0171260 | A1* | 6/2023 | Sloane | H04L 63/205 |
| | | | | 726/4 |

* cited by examiner

APPARATUS AND METHOD FOR MACHINE-LEARNING-BASED POSITIONING DATABASE CREATION AND POSITIONING OF UNCOLLECTED POINTS USING MATCHING FEATURE WITH WIRELESS COMMUNICATION INFRASTRUCTURE

CROSS REFERENCE TO RELATED APPLICATION

This application claims the benefit of Korean Patent Application No. 10-2021-0057789, filed May 4, 2021, which is hereby incorporated by reference in its entirety into this application.

BACKGROUND OF THE INVENTION

1. Technical Field

The disclosed embodiment relates to technology for machine-learning-based creation of a positioning database and positioning of uncollected points using matching feature points of wireless communication infrastructure.

2. Description of the Related Art

Global-Positioning-System—(GPS)-based positioning technology using a GPS satellite may provide information about the location of a user terminal equipped with a GPS receiver in the form of coordinates according to a global coordinate system (e.g., latitude, longitude, altitude, and the like) with location accuracy of several to dozens of meters in outdoor areas all over the world. In the future, the availability and accuracy of outdoor location information are expected to improve with the introduction of additional global navigation satellite systems, such as Galileo in Europe, GLONASS in Russia, and the like.

However, when such GPS-based positioning technology is used indoors or in dense urban areas, received signals may be weak due to signal blocking by buildings, or multi-path errors may increase, which makes it impossible to determine a location or decreases location accuracy. Also, there is a problem in which Time-To-First-Fix (TTFF) increases with a decrease in the number of visible satellites.

On the other hand, positioning technology based on mobile communication base stations may reduce TTFF, compared to GPS-based positioning technology, but has a disadvantage in that location accuracy thereof is lower than that of GPS-based positioning technology.

Generally, base-station-based positioning technology may be categorized as follows.

The first technology is Cell-ID technology. This is a method for calculating the location of a terminal by mapping the same to information about the location at which the base station to which the terminal is connected is installed using the identifier of the base station. This method has location accuracy of hundreds of meters to several kilometers depending on the coverage of the base station.

The second one is trilateration technology. This is a method for converting the strength of signals transceived between a terminal and multiple base stations into distance information and calculating the location of the terminal using the distance information and accurate information about the locations at which the multiple base stations are installed.

Time-of-Arrival (ToA) technology is a method for measuring the time taken for a signal transmitted from multiple base stations to reach a terminal, converting the time information to distance information, and calculating the location of the terminal using the distance information and accurate information about the locations at which the multiple base stations are installed.

Time Difference of Arrival (TDoA) technology is a method for calculating the location of a terminal using the difference between arrival times at two or more pairs of base stations.

Angle of Arrival (AoA) technology is a method for calculating the location of a terminal using information about the angles formed between multiple received signals and accurate information about the locations at which two or more base stations are installed when the terminal signals are received by the multiple base stations. This has an advantage that there is no special requirement for the terminal, but has a disadvantage in that a special device is required for measuring angles at the base stations.

Meanwhile, Wi-Fi-based positioning technology may provide precise location information with accuracy within several meters using the strength of signals from Wi-Fi APs and the like in large buildings and in dense urban areas, in which no GPS signal is received or in which a GPS signal contains a large location error. Recently, led by Skyhook Wireless in the U.S., the areas in which service is available have expanded to large cities using wardriving (or AP mapping) technology. However, such AP mapping technology using vehicles has a problem in which it is costly to initially construct a Wi-Fi AP database. Also, because collection is performed outdoors, GPS location information is used to indicate the collection locations, which makes it impossible to acquire information about collection locations in indoor areas, in which it is difficult to receive GPS signals. Also, even if a Wi-Fi AP DB has been constructed in advance, when the terminal to be localized is out of the coverage thereof or when a Wi-Fi AP signal is intermittently measured or is not measured by the terminal, location information cannot be provided. Further, when Wi-Fi APs are moved, newly installed, or removed, it is necessary to update the Wi-Fi AP DB by periodically collecting information thereabout.

Generally, Wi-Fi-based positioning technology is classified as follows.

First, there is a method in which, when the location at which a Wi-Fi Access Point (AP) is installed is known, the location of a terminal is calculated using Cell-ID, centroid, trilateration, and the like.

Secondly, there is a fingerprint or nearest-neighbor method in which, when the location at which a Wi-Fi AP is installed is not known, the MAC Address, the Received Signal Strength Indicator (RSSI), the Round-Trip Time (RTT), the Angle of Arrival (AoA), and the like of a signal that is transmitted from each Wi-Fi AP and received at a reference location, the accurate location information of which is known or is capable of being calculated, are patterned in advance and the reference location having the pattern that is most similar to the pattern received by the terminal to be localized is provided as the location of the terminal.

Location information for emergency service indicates location information provided by a location information provider (e.g., a mobile communication provider) in response to a request from an emergency service organization, which is made when the emergency service organization receives a request for the emergency service (e.g., 112 or 119 in South Korea, 911 in the U.S., 112 in Europe, and the like).

Positioning technology for providing location information for emergency service mainly uses positioning technology based on GPS, a base station, or Wi-Fi. When an emergency service organization requests location information pertaining to the mobile phone number from which a request for emergency service is received, the corresponding mobile communication company provides the emergency service organization with the location information, which is calculated using positioning technology by interworking with a positioning server and the terminal that requested the emergency service.

However, only when a request for emergency service is made can location information be calculated, and only by the mobile communication company to which the terminal that requested the emergency service is subscribed. Therefore, it is difficult to use measurement information that is accumulated before the request for the emergency service or to provide location information corrected using map information or the like. Particularly, positioning technology based on a base station has limitations in improving location accuracy because only information measured by a small number of base stations that are currently communicating with the terminal or that are located in the vicinity thereof can be used. Also, in order to apply fingerprint positioning technology, which is suitable for precise positioning based on a base station or Wi-Fi, a method for overcoming the following technical problems is required.

First, it is necessary to solve a problem in which location accuracy is degraded when positioning of an uncollected point is requested. As a solution to this problem, a machine-learning regression analysis method, which creates a positioning DB by estimating hypothetical measurement information in a standardized grid cell, including uncollected points, using collected data (collection locations and information measured by each positioning resource), may be used. However, because it is impossible to predict the point at which a request for positioning for provision of emergency service can be made, when the range of the collected data expands all over the country or when the amount of data is increased, a lot of computation time and storage space are required to create, in advance, a positioning DB for each positioning resource (e.g., LTE infrastructure, Wi-Fi infrastructure, BLE infrastructure, and the like) in a standardized grid cell including uncollected points.

Also, whenever collected data is added or modified, a method for efficiently incorporating the same in the positioning DB is required. That is, if it is required to again create all positioning DBs for respective types of infrastructure in all areas in which positioning can be performed whenever a small amount of collected data is updated, the method is determined to be a very inefficient positioning DB creation method.

Also, when the measurement environment of the positioning DB, which is estimated using collected data (outdoor environment), is different from the measurement environment of the measured values for positioning (indoor environment), a large error in the received signal strength between the positioning DB and the measured information for positioning may be caused due to the difference between the indoor and outdoor environments. Accordingly, a positioning DB creation method that is unaffected by such an error or that is capable of compensating for such an error is required.

Finally, in order to support optimal positioning by combining heterogeneous types of positioning infrastructure, a positioning DB creation method enabling positioning resources to be easily combined is required.

SUMMARY OF THE INVENTION

An object of the disclosed embodiment is to provide an apparatus and method for creation of a positioning database and positioning of uncollected points based on machine learning using matching feature points of wireless communication infrastructure in order to provide location information for emergency service all over the country by overcoming problems with conventional positioning DB creation.

Another object of the disclosed embodiment is to provide an apparatus and method for creating a positioning database in real time based on matching feature points of each positioning resource using only a small amount of collected data that matches the current positioning data, rather than using a conventional method in which a positioning DB is created in advance based on the strengths of signals from respective positioning resources using a large amount of collected data.

A further object of the disclosed embodiment is to use matching feature points between collected data and positioning data of each positioning infrastructure as feature points for positioning, rather than using signal strength, thereby providing an apparatus and method capable of providing positioning performance independently of a received signal strength error.

Yet another object of the disclosed embodiment is to represent the final output value of a positioning DB as a matching probability density function in a grid cell for each positioning resource, thereby providing an apparatus and method enabling data from multiple available positioning resources included in the positioning data to be used to estimate an optimal composite location by easily combining the same.

An apparatus for positioning of uncollected points based on machine learning using matching points of wireless communication infrastructure according to an embodiment includes memory in which at least one program according to an embodiment is recorded and a processor for executing the program. The program may perform comparing collected data acquired from wireless communication infrastructure with positioning data measured by a positioning target terminal and thereby extracting matching feature points, creating a fingerprint database of global grid cells, including uncollected points, for the extracted feature points in real time, and estimating the optimal composite location of the positioning target terminal based on the created fingerprint database.

Here, the program may further perform parsing unstructured collected data into collection location information and first multiple-source data for positioning; storing the collection location information and the first multiple-source data for positioning in a database; and parsing second multiple-source data for positioning measured by the positioning target terminal, and extracting the matching feature points may be configured to use the collection location information and the first multiple-source data for positioning, which are stored in the database, as the collected data and to use the measured second multiple-source data for positioning as the positioning data.

Here, the first multiple-source data for positioning and the second multiple-source data for positioning are capable of including at least one of a post-processed file and data transmitted in real time. Here, extracting the matching feature points may include checking whether the first multiple-source data for positioning matches the second multiple-source data for positioning through a comparison therebetween; extracting one or more matching locations, each of which is a collection location at which the first multiple-source data for positioning matches the second multiple-source data for positioning; and calculating a matching feature point in each of the extracted one or more matching locations.

Here, extracting the matching feature points may be performed for each positioning resource including at least one of LTE infrastructure, Wi-Fi infrastructure, and Bluetooth Low Energy (BLE) infrastructure.

Here, the matching feature points may include at least one of a match count between the collected data and the positioning data, a correlation coefficient between the collected data and the positioning data, and a combined value of the match count and the correlation coefficient.

Here, the correlation coefficient between the collected data and the positioning data may have a positive value close to 1 when a collection location and a measurement location of each positioning resource are identical to each other. Here, a match count for each positioning resource may be proportional to discrimination capability of the correlation coefficient, and extracting the matching feature points may be configured to extract the matching feature points by additionally using a difference between the correlation coefficients of two matching feature points having an identical match count.

Here, creating the fingerprint database of the global grid cells in real time may include creating the global grid cells based on the matching location and the matching point in each of the matching locations; estimating the matching feature point in the global grid cell based on a machine-learning regression algorithm; and normalizing the estimated matching feature point in the global grid cell and performing conversion to a matching probability density function.

Here, the machine-learning regression algorithm may use a Gaussian Process Regression (GPR) algorithm.

Here, the conversion to the matching probability density function may be performed for each positioning resource including at least one of LTE infrastructure, Wi-Fi infrastructure, and Bluetooth Low Energy (BLE) infrastructure.

Here, estimating the optimal composite location may be configured to calculate an estimated location at which a composite probability that the positioning target terminal is present is maximized when a maximum match count between the collected data and the positioning data is given.

A method for positioning of uncollected points based on machine learning using matching points of wireless communication infrastructure according to an embodiment may include comparing collected data acquired from wireless communication infrastructure with positioning data measured by a positioning target terminal and thereby extracting matching feature points; creating a fingerprint database of global grid cells, including uncollected points, for the extracted feature points in real time; and estimating the optimal composite location of the positioning target terminal based on the created fingerprint database.

Here, the method may further include parsing unstructured collected data into collection location information and first multiple-source data for positioning; storing the collection location information and the first multiple-source data for positioning in a database; and parsing second multiple-source data for positioning measured by the positioning target terminal, and extracting the matching feature points may be configured to use the collection location information and the first multiple-source data for positioning, which are stored in the database, as the collected data and to use the measured second multiple-source data for positioning as the positioning data.

Here, extracting the matching feature points may include checking whether the first multiple-source data for positioning matches the second multiple-source data for positioning through a comparison therebetween; extracting one or more matching locations, each of which is a collection location at which the first multiple-source data for positioning matches the second multiple-source data for positioning; and calculating a matching point in each of the extracted one or more matching locations.

Here, extracting the matching feature points may be performed for each positioning resource including at least one of LTE infrastructure, Wi-Fi infrastructure, and Bluetooth Low Energy (BLE) infrastructure.

Here, creating the fingerprint database of the global grid cells in real time may include creating the global grid cells based on the matching locations and the match count in each of the matching locations; estimating the match count in the global grid cell based on a machine-learning regression algorithm; and normalizing the estimated match count in the global grid cell and performing conversion to a matching probability density function.

Here, the machine-learning regression algorithm may use a Gaussian Process Regression (GPR) algorithm.

Here, the conversion to the matching probability density function may be performed for each positioning resource including at least one of LTE infrastructure, Wi-Fi infrastructure, and Bluetooth Low Energy (BLE) infrastructure.

Here, estimating the optimal composite location may be configured to calculate an estimated location at which a composite probability that the positioning target terminal is present is maximized when a maximum match count between the collected data and the positioning data is given.

Here, the matching feature points may include at least one of a match count between the collected data and the positioning data, a correlation coefficient between the collected data and the positioning data, and a combined value of the match count and the correlation coefficient.

A method for creating a database of uncollected points based on machine learning using matching points of wireless communication infrastructure according to an embodiment may include comparing collected data acquired from wireless communication infrastructure with positioning data measured by a positioning target terminal and thereby extracting matching feature points; and creating a fingerprint database of global grid cells, including uncollected points, for the extracted feature points in real time.

The method may further include parsing unstructured collected data into collection location information and first multiple-source data for positioning; storing the collection location information and the first multiple-source data for positioning in a database; and parsing second multiple-source data for positioning measured by the positioning target terminal, and extracting the matching feature points may be configured to use the collection location information and the first multiple-source data for positioning, which are stored in the database, as the collected data and to use the measured second multiple-source data for positioning as the positioning data.

Here, extracting the matching feature points may include checking whether the first multiple-source data for positioning matches the second multiple-source data for positioning through a comparison therebetween; extracting one or more matching locations, each of which is a collection location at which the first multiple-source data for positioning matches the second multiple-source data for positioning; and calculating a matching point in each of the extracted one or more matching locations.

Here, creating the fingerprint database of the global grid cells in real time may include creating the global grid cells based on the matching locations and the matching point in each of the matching locations; estimating the matching point in the global grid cell based on a machine-learning regression algorithm; and normalizing the estimated matching point in the global grid cell and performing conversion to a matching probability density function.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

Figure 1:
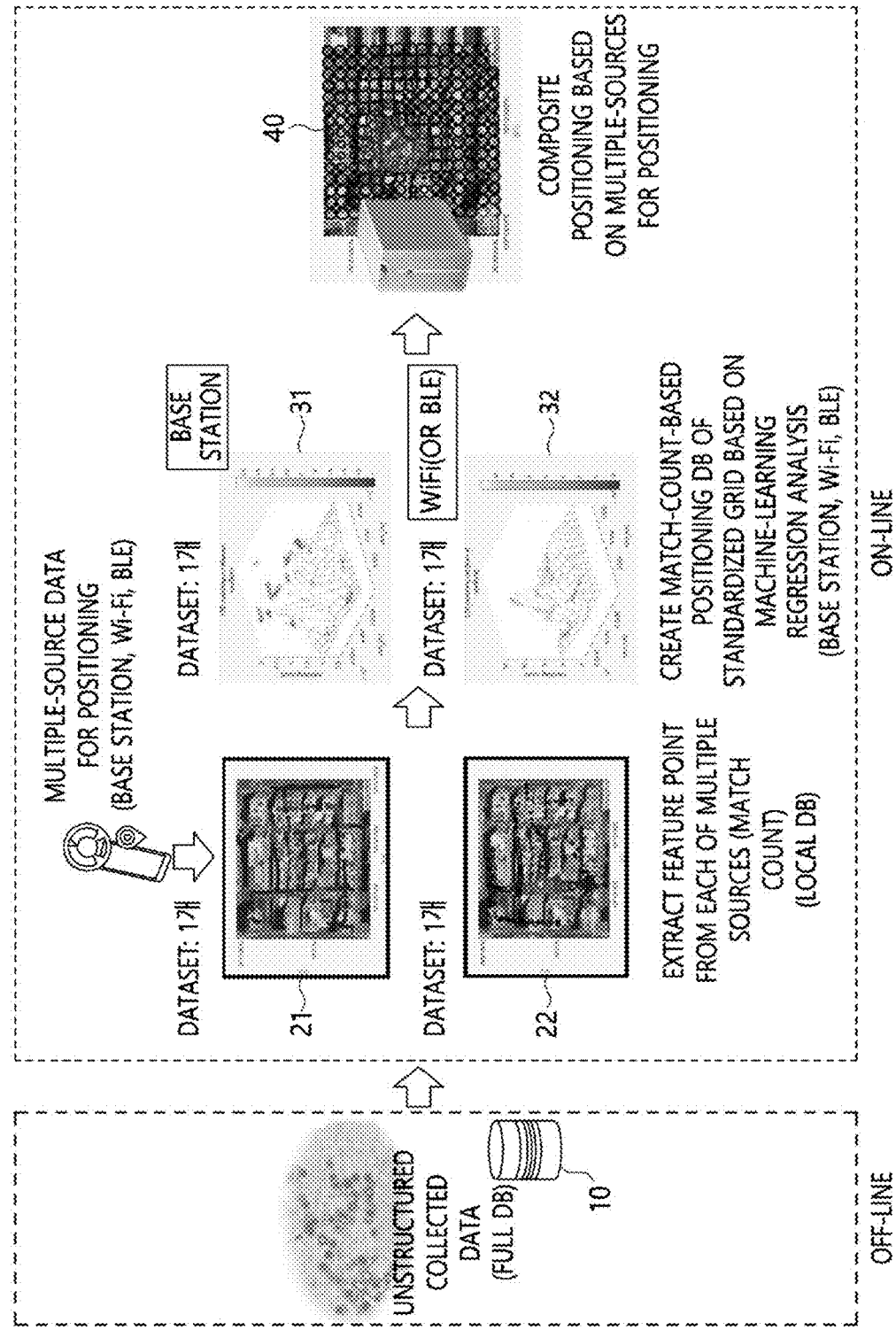
FIG. 1 is an exemplary view for explaining the concept of creation of a positioning database and positioning of uncollected points based on machine learning using matching points of wireless communication infrastructure.

The advantages and features of the present invention and methods of achieving the same will be apparent from the exemplary embodiments to be described below in more detail with reference to the accompanying drawings. However, it should be noted that the present invention is not limited to the following exemplary embodiments, and may be implemented in various forms. Accordingly, the exemplary embodiments are provided only to disclose the present invention and to let those skilled in the art know the category of the present invention, and the present invention is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present invention.

The terms used herein are for the purpose of describing particular embodiments only, and are not intended to limit the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, an apparatus and method according to an embodiment will be described in detail with reference to FIGS. 1 to 8.

FIG. 1 is an exemplary view for explaining the concept of creation of a positioning database and positioning of uncollected points based on machine learning using matching points of wireless communication infrastructure.

Referring to FIG. 1, unstructured collected data means collection location information at an arbitrary collection point and multiple-source data for positioning.

When collection location information is not present, only multiple-source data for positioning may be stored as unstructured collected data.

Particularly, unstructured collected data may be raw data that is collected in the state in which the collection path, the collection method, the collection time, the number of times the data is collected, and the like are not limited to specific conditions.

Here, the collection method may be classified into collection using a vehicle, collection using a mobile phone, and the like according to the device used to collect the data. Also, the collection method may be classified into static collection or dynamic collection according to whether mobility is provided at the time of collection.

The multiple-source data for positioning indicates values measured by the terminal, the location of which is to be calculated, the measured values being based on signals received from wireless communication positioning infrastructure and sensors.

For example, the multiple-source data for positioning may be measured values received from base stations, Wi-Fi APs, BLE beacons, and sensors (a barometer, an acceleration sensor, a gyroscope, a geomagnetic sensor, a camera, and the like).

Generally, a positioning DB for localization is classified into a database of installation locations of wireless communication positioning infrastructure, a fingerprint database in which collection location information is combined with multiple-source data for positioning, and the like.

In order to provide more precise location information, the use of a fingerprint database is a more suitable implementation method, but has a problem in which, when positioning of an uncollected point is requested, a location error may increase because no location fingerprint pertaining to the corresponding point is present.

Also, as the amount of collected data is increased with expansion of a collection area, construction of a fingerprint database for each type of wireless communication infrastructure in advance so as to include all candidate points, positioning of which is expected to be requested, may incur a lot of computation time and expense.

In order to solve this problem, the present invention proposes a method in which feature points found to match unstructured collected data as the result of a comparison of multiple-source data for positioning (that is, a match count) are extracted in response to a request for positioning and then a fingerprint database of a standardized grid including uncollected points is created in real time for the corresponding feature points (e.g., the match count) and is used for positioning, rather than using a method of creating a fingerprint database in advance and using wireless communication infrastructure that matches the result of a comparison of received signal strength of the multiple-source data for positioning with received signal strength in the fingerprint database in response to a request for positioning.

Figure 2:
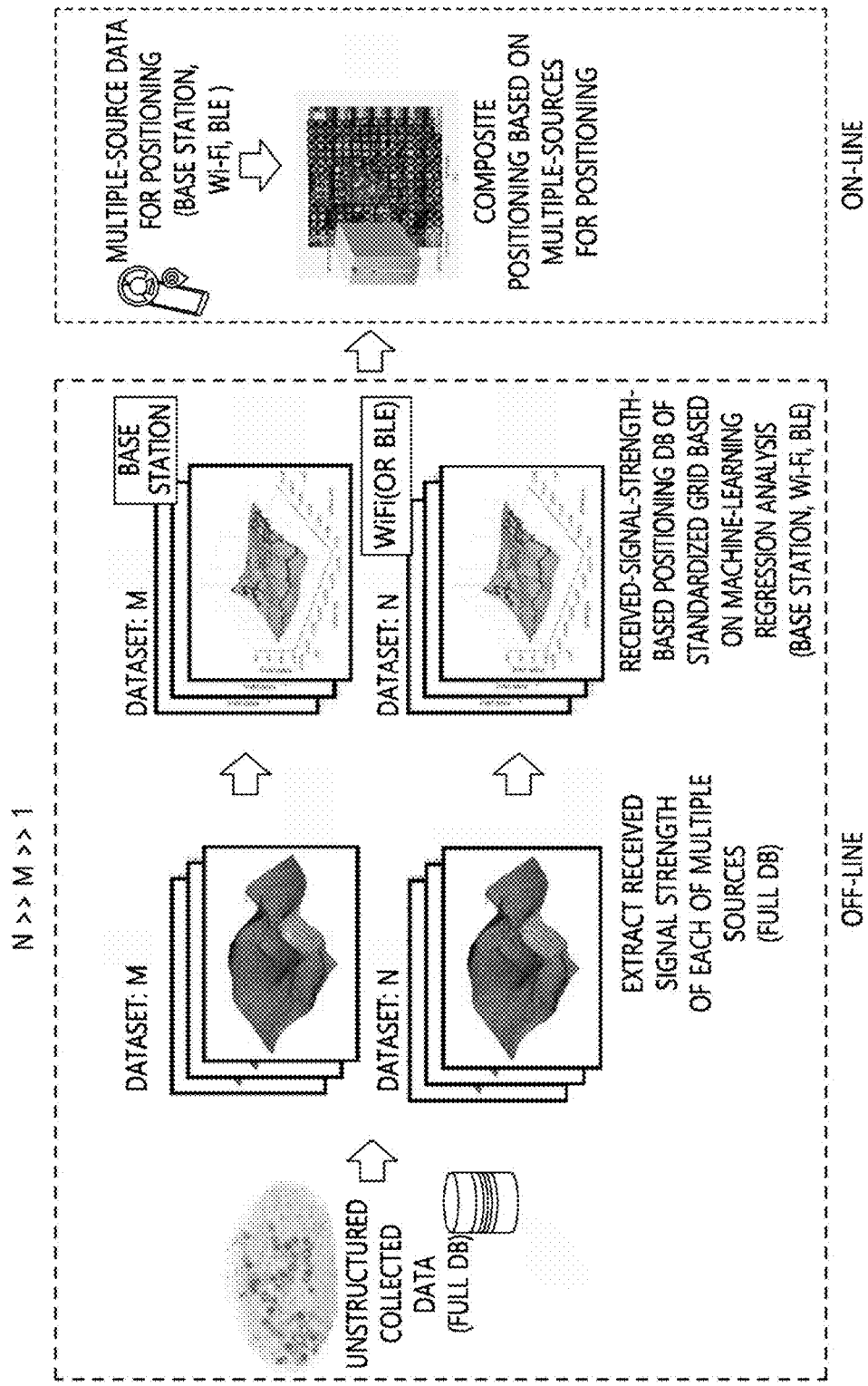
FIG. 2 is an exemplary view illustrating a conventional method for creating a fingerprint database.

FIG. 2 is an exemplary view illustrating a conventional method for creating a fingerprint database.

Referring to FIG. 2, when M base stations and N Wi-Fi APs are present, a conventional fingerprint database is configured in such a way that collected data on the corresponding base stations or Wi-Fi APs is acquired from unstructured collected data and then a number of received-signal-strength-based positioning DBs of a standardized grid based on machine-learning regression analysis equal the number of base stations (M datasets) or the number of Wi-Fi APs (N datasets) is created.

However, according to an embodiment of the present invention, after a match count is calculated for a base station or a Wi-Fi AP by matching multiple-source data for positioning with unstructured collected data, a number of matching-count-based positioning DBs of a standardized grid based on machine-learning regression analysis equal to the match count of the base station (a single dataset) or the match count of the Wi-Fi AP (a single dataset) is created.

Accordingly, an embodiment of the present invention has a greater effect on reducing the number of repetitions of calculation required for machine-learning regression analysis as M and N increase.

Also, when matching of multiple-source data for positioning and collected data is performed using a received-signal-strength-based positioning DB, as in the conventional method, if the collection and positioning environments differ from each other, a large location error may be caused due to signal interference, attenuation, distortion, or the like.

However, because an embodiment of the present invention uses matching points after comparing only identifiers, a positioning DB that is robust to the difference between the received signal strength of collected data and the received signal strength of multiple-source data for positioning may be created.

Figure 3:
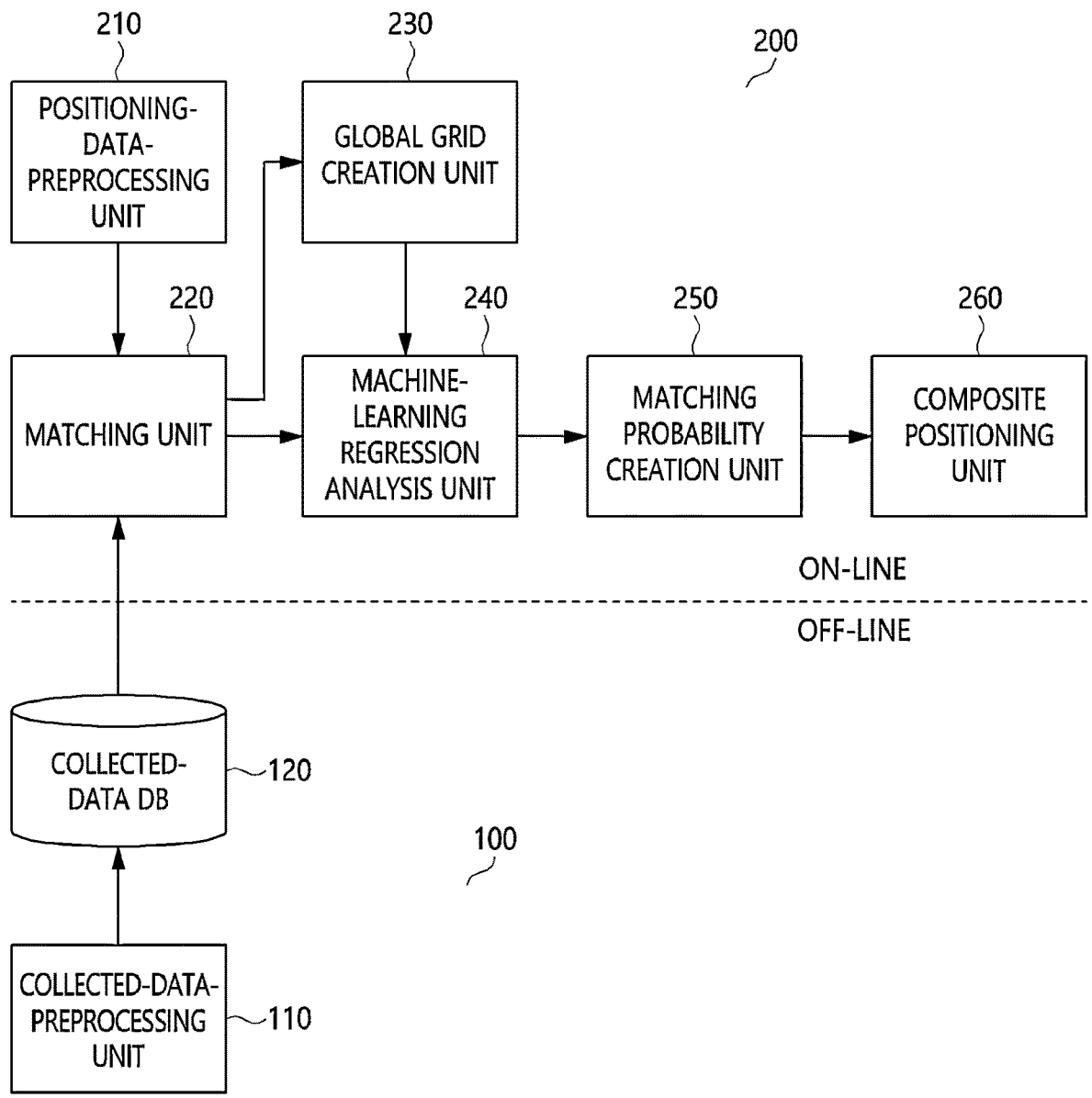
FIG. 3 is a schematic block diagram of an apparatus for positioning of uncollected points based on machine learning using matching points of wireless communication infrastructure according to an embodiment.
Figure 4:
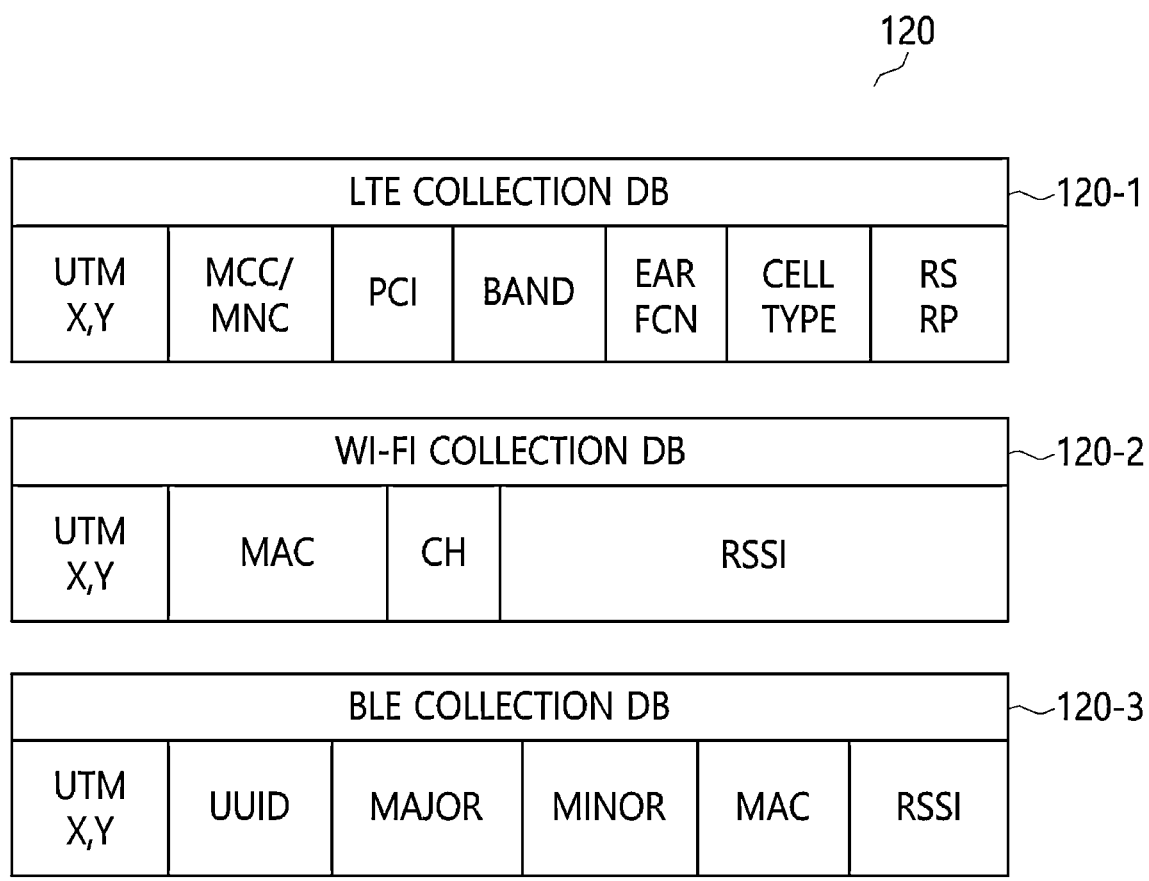
FIG. 4 is a detailed block diagram of a collected-data DB according to an embodiment.
Figure 5:
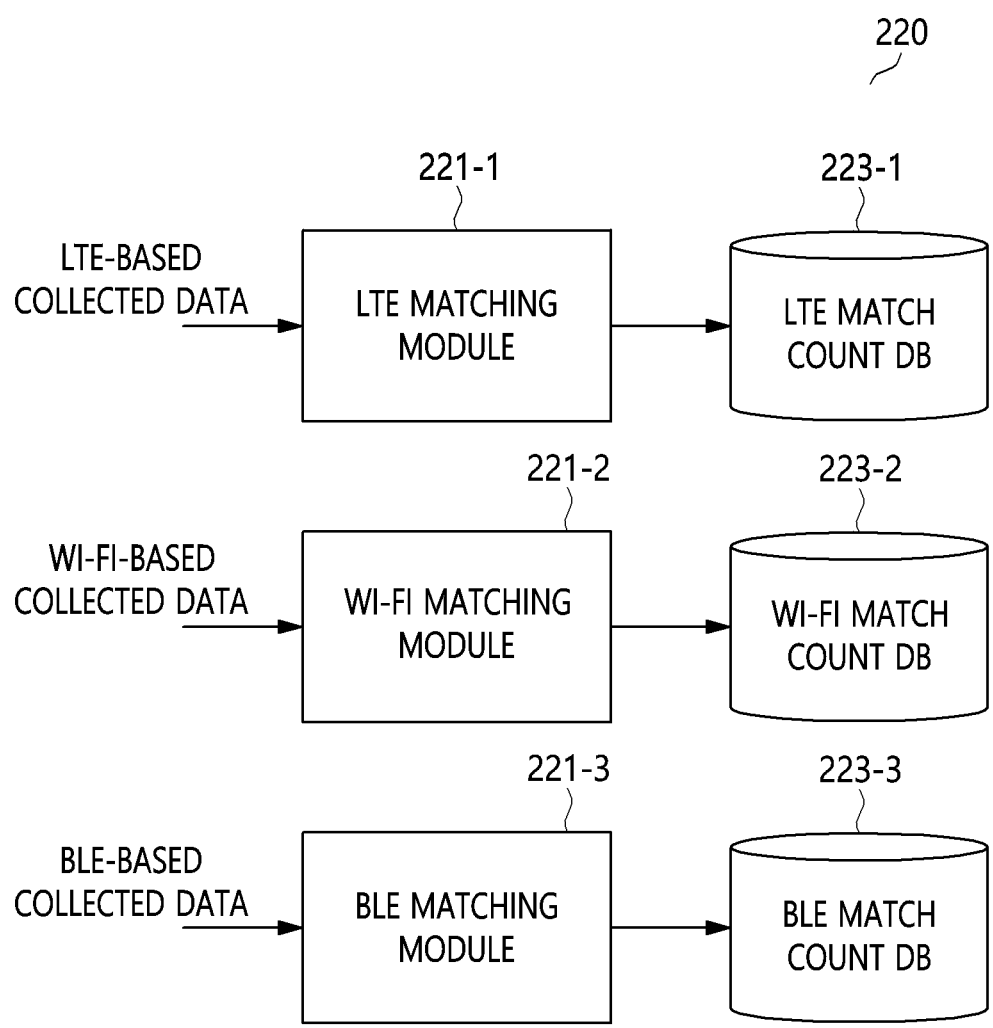
FIG. 5 is a detailed block diagram of a matching unit according to an embodiment.
Figure 6:
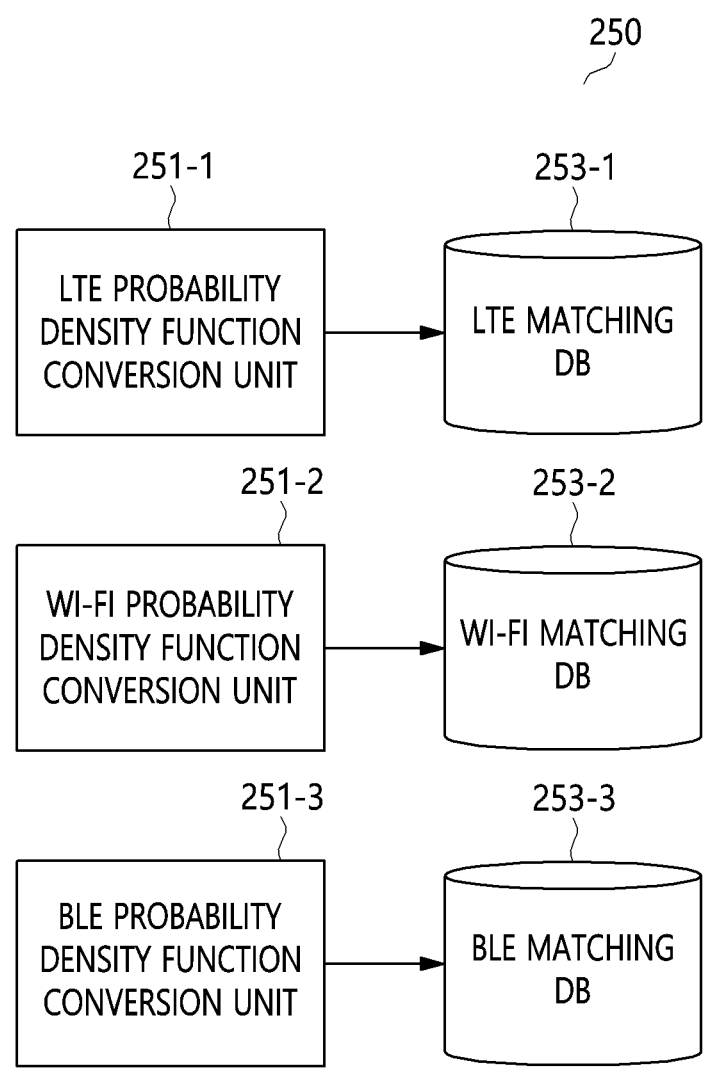
FIG. 6 is a detailed block diagram of a matching probability creation unit according to an embodiment.

FIG. 3 is a schematic block diagram of an apparatus for positioning of uncollected points based on machine learning using matching points of wireless communication infrastructure according to an embodiment, FIG. 4 is a detailed block diagram of a collected-data DB according to an embodiment, FIG. 5 is a detailed block diagram of a matching unit according to an embodiment, and FIG. 6 is a detailed block diagram of a matching probability creation unit according to an embodiment.

Referring to FIG. 3, a collected-data-preprocessing unit 110 parses unstructured collected data into collection location information and first multiple-source data for positioning.

Here, the unstructured collected data may be data in formats, including a file, an API, a DB, and the like. However, these are examples, and the format of the unstructured collected data is not limited. That is, data in various other formats, including collection location information and first multiple-source data for positioning, may be included in the unstructured collected data.

Also, when necessary, the collected-data-preprocessing unit 110 may convert the coordinated system of the collection location information into another coordinate system suitable for the purpose. For example, a WGS84 coordinate system may be converted into a UTM coordinate system.

The collected-data DB 120 stores the collection location information and the first multiple-source data for positioning, acquired as the result of parsing, in the form of a database.

According to an embodiment, referring to FIG. 4, the collected-data DB 120 includes an LTE collection DB 120-1, a Wi-Fi collection DB 120-2, and a Bluetooth Low Energy (BLE) collection DB 120-3, and each of the DBs may store collection location information and First multiple-source data for positioning.

Here, the collection location information may be a GPS position using a UTM coordinate system (an X coordinate, a Y coordinate, and a Z coordinate (optional)).

Here, the LTE collection DB 120-1 may include an MCC, which is a country code, an MNC, which is a network provider code, a Physical Cell ID (PCI) or Cell-ID, band, which is the frequency band of LTE, E-UTRA Absolute Radio-Frequency Channel Number (EARFCN), a cell-type (an identifier indicative of serving or non-serving), a Reference Signal Received Power (RSRP), and a Timing Advance (TA) as the first multiple-source data for positioning.

Here, the Wi-Fi collection DB 120-2 may include a MAC address, a channel, and a Received Signal Strength Indicator (RSSI) as the first multiple-source data for positioning.

The BLE collection DB 120-3 may include a UUID, a Major number, a Minor number, a MAC address, and an RSSI as the first multiple-source data for positioning.

However, the format of collected data illustrated in FIG. 4 is an example, and the present invention is not limited thereto. That is, the collected data according to an embodiment may include all information capable of being received from wireless communication infrastructure as well as the detailed information illustrated in FIG. 4.

Referring again to FIG. 3, a positioning-data-preprocessing unit 210 parses second multiple-source data for positioning, which is measured by a positioning target terminal.

Here, when the positioning target terminal receives a request for positioning from the outside or receives a request for positioning through an application installed therein, an agent in the positioning target terminal is executed, whereby second multiple-source data for positioning is acquired.

Here, the second multiple-source data for positioning may have details similar to those of the first multiple-source data for positioning included in the above-described collected-data DB 120.

The matching unit 220 compares the positioning data, which is received from the positioning-data-preprocessing unit 210, with the collected data stored in the collected-data DB 120, thereby extracting matching feature points.

Specifically, the matching unit 220 may check whether the first multiple-source data for positioning matches the second multiple-source data for positioning through a comparison therebetween, extract one or more matching locations, each of which is a collection location at which the first multiple-source data for positioning matches the second multiple-source data for positioning, and calculate a match count in each of the extracted one or more matching locations.

Here, the matching location may be the collection location information included in the collected data, and this is referred to as a local grid cell.

According to an embodiment, referring to FIG. 5, the matching unit 220 may include an LTE matching module 221-1, an LTE match count DB 223-1, a Wi-Fi matching module 221-2, a Wi-Fi match count DB 223-2, a BLE matching module 221-3, and a BLE match count DB 223-3.

The LTE matching module 221-1 compares collected data based on LTE with positioning data, calculates the UTM coordinates (local grid cell) of the collected data, of which the LTE PCI (or Cell-ID), the band, the EARFCN, and the cell-type match those of the positioning data, and an LTE match count, and stores the same in the LTE match count DB 223-1.

The Wi-Fi matching module 221-2 compares collected data based on Wi-Fi with positioning data, calculates the UTM coordinates (local grid cell) of the collected data, the Wi-Fi MAC address of which matches that of the positioning data, and a Wi-Fi match count, and stores the same in the Wi-Fi match count DB 223-2.

The BLE matching module 221-3 compares collected data based on BLE with positioning data, calculates the UTM coordinates (local grid cell) of the collected data, the BLE MAC address of which matches that of the positioning data, and a BLE match count, and stores the same in the BLE match count DB 223-3.

Here, $n_k^i$ is the match count between positioning data and collected data at the location($x_k^{ij}$, $y_k^{ij}$), which is the k-th location of the i-th positioning resource, and may be defined as shown in Equation (1) below:

$$n_k^i = \sum_m \sum_n \text{match}\left(ID_{meas_m^i}, ID_{col_{k,n}^i}\right),$$ (1)

$m = 1, 2, \ldots, AP_{meas}$, $n = 1, 2, \ldots, AP_{col}$ $k = 1, 2, \ldots, N_{col}$, $Infratype(i) = (LTE, WiFi, BLE)$ In Equation (1), $ID_{meas_m^i}$ means the m-th identifier vector of the positioning data of the i-th positioning resource. For example, the m-th identifier vectors of LTE (i=1), Wi-Fi (i=2), and BLE (i=3) may be respectively represented as shown in Equations (2) to (4) below:

$$ID_{meas_m^1} = [PCI_m, Band_m, EARFCN_m, Celltype_m]$$ (2)

$$ID_{meas_m^2} = [MAC_m]$$ (3)

$$ID_{meas_m^3} = [MAC_m]$$ (4)

Also, in Equation (1), $ID_{col_{k,n}^i}$ means the n-th identifier vector of the collected data at the location($x_k^{ij},y_k^{ij}$), which is the k-th location of the i-th positioning resource. For example, the n-th identifier vectors of LTE (i=1), Wi-Fi (i=2), and BLE (i=3) may be respectively represented as shown in Equations (5) to (7) below:

$$ID_{col_{k,n}^1} = [PCI_{k,n}, Band_{k,n}, EARFCN_{k,n}, Celltype_{k,n}]$$ (5)

$$ID_{col_{k,n}^2} = [MAC_{k,n}]$$ (6)

$$ID_{col_{k,n}^3} = [MAC_{k,n}]$$ (7)

Also, the match (X, Y) function in Equation (1) is a function that outputs 1 when X=Y but outputs 0 otherwise.

Referring again to FIG. 3, a global grid creation unit 230 creates reference location grid cells (coordinates in a standardized grid) including trajectories based on the UTM coordinates of the collected data that matches the positioning data for each positioning resource.

According to an embodiment, positioning resources correspond to LTE, Wi-Fi, BLE, and the like, and the range of the global grid is set to the range of the collected data that matches LTE positioning data that has the maximum transmission range, among the positioning resources. Accordingly, when a user-input parameter indicating the grid spacing is defined as $m_{res}$, the maximum/minimum UTM coordinates $x_{min}^g$, $y_{min}^g$, $x_{max}^g$, and $y_{max}^g$ for creating a global grid may be calculated as shown in Equation (8) below:

$$x_{min}^g = \min_x\{x_1^t, x_2^t, \ldots, x_{N_d}^t\} - m_{res}$$ (8)

$$y_{min}^g = \min_y\{y_1^t, y_2^t, \ldots, y_{N_d}^t\} - m_{res}$$

$$x_{max}^g = \max_x\{y_1^t, y_2^t, \ldots, y_{N_d}^t\} + m_{res}$$

$$y_{max}^g = \max_y\{y_1^t, y_2^t, \ldots, y_{N_d}^t\} + m_{res}$$

In Equation (8), ($x_i^t$, $y_i^t$) indicates the UTM coordinates of the collected data that matches the LTE positioning data, and Nd indicates the number of pieces of collected data that matches the LTE positioning data.

Based on a regression method, a machine-learning regression analysis unit 240 estimates the value of a match count in a global grid cell using a processed collected data set (a list comprising a location (local coordinates) at which collected data matches positioning data and a match count) provided by the matching unit 220.

As an embodiment, an example in which the average and covariance of the match count estimated in an arbitrary standardized grid are calculated using a Gaussian Process Regression (GPR) method will be described. However, this is an example for helping understanding of the present invention, and the regression method of the present invention is not limited thereto.

When training input/output and test input/output for applying GPR are (X, Y) and ($X_*$, $Y_*$), respectively, the result of inference of the test output for the test input may be represented as a conditional Gaussian distribution, as shown in Equation (9) below:

$$P(Y_*|X_*,X,Y) = \mathcal{N}(\mu_*,\Sigma_*)$$ (9)

The average $\mu_*$ and covariance $\Sigma_*$ of the Gaussian distribution estimated in Equation (9) may be calculated as shown in Equation (10) below:

$$\mu_* = \mathcal{K}_{(X_*,X)}^T(K+\beta^2 I)^{-1} y$$

$$\Sigma_* = \mathcal{K}_{(X_*,X_*)} - \mathcal{K}_{(X_*,X)}^T(K+\beta^2 I)^{-1}\mathcal{K}_{(X_*,X)} \quad (10)$$

In Equation (10), K and $\mathcal{K}$ respectively indicate a covariance kernel function and a covariance matrix calculated from the kernel function, and β indicates the standard deviation of Gaussian noise added to each output value.

In an embodiment, in order to create a positioning DB in an arbitrary global grid cell including uncollected points, the training input/output of a GPR module for the match count for each positioning resource may be defined as shown in Equation (11) below:

$$X_k^i = (x_k^i, y_k^i), Y_k^i = n_k^i, \text{Infratype}(i) = \{LTE, WiFi, BLE\} \quad (11)$$

In Equation (11), $n_k^i$ is the match count between positioning data and collected data at the location $(x_k^i, y_k^i)$, which is the k-th location of the i-th positioning resource. The test input of GPR may be defined as the locations of the global grid cells (of a standardized grid) including the collected data that matches the positioning data.

Here, the kernel function to be applied may be an optimized kernel function that is selected in consideration of the characteristics of each kernel, or may be generated by combining two or more functions.

A matching probability creation unit 250 normalizes the match count in the global grid cell, which is estimated by the machine-learning regression analysis unit 240, and coverts the same to a matching probability density function.

According to an embodiment, referring to FIG. 6, the matching probability creation unit 250 may include an LTE probability density function conversion unit 251-1, an LTE matching DB 253-1, a Wi-Fi probability density function conversion unit 251-2, a Wi-Fi matching DB 253-2, a BLE probability density function conversion unit 251-3, and a BLE matching DB 253-3.

The LTE probability density function conversion unit 251-1 normalizes the match count in an LTE global grid cell, converts the same to a matching probability density function, and stores the same in the LTE matching DB 253-1.

The Wi-Fi probability density function conversion unit 251-2 normalizes the match count in a Wi-Fi global grid cell, converts the same to a matching probability density function, and stores the same in the Wi-Fi matching DB 253-2.

The BLE probability density function conversion unit 251-3 normalizes the match count in a BLE global grid cell, converts the same to a matching probability density function, and stores the same in the BLE matching DB 253-3.

Here, as an embodiment for calculating a probability density function, the result of inference of an output value by the machine-learning regression analysis unit 240 may have a probability distribution as shown in Equation (12) below:

$$P(Y_*|X_*,X,Y) = \mathcal{N}(\mu_*, \Sigma_*) \quad (12)$$

Finally, the normalized matching probability density function for the i-th positioning resource may be defined as shown in Equation (13) below:

$$\text{PDF}_{X_*}^i\_\text{type1} = P(\max(Y_*)|X_*,\mu_*,\Sigma_*)/\text{sum}(P(\max(Y_*)|X_*,\mu_*,\Sigma_*)) \quad (13)$$

If a weight proportional to the match count $Y_*$ is assigned, an improved probability density function may be defined as shown in Equation (14) below:

$$\text{PDF}_{X_*}^i\_\text{type1} = P(\max(Y_*)|X_*,\mu^*,\Sigma_*)/\text{sum}(P(\max(Y_*)|X_*,\mu_*,\Sigma_*)) \quad (14)$$

Meanwhile, when the maximum match count $Y_m$ between the positioning data and collected data for each positioning resource is given, a composite positioning unit 260 calculates the estimated location $\widehat{X_*}$ at which the composite probability that the positioning target terminal $X_*$ is present is maximized.

As an embodiment, when it is assumed that i positioning resources are present, the final location may be represented as shown in Equation (15).

$$\widehat{X_*} = \max_{X_*} \prod_i P(X_* | Y_m) \sim \max_{X_*} \prod_i Y_* \times \quad (15)$$

$$P\left(\max(Y_*) | X_*, \mu_*, \sum_k\right)/\text{sum}\left(P\left(\max(Y_*) | X_*, \mu_*, \sum_k\right)\right) =$$

$$\max_{X_*} \prod_i Y_* \times$$

$$\left(\frac{1}{\sqrt{(2\pi)^d |\sum_k|}} \exp\left(-\frac{1}{2}(\max(Y_*) - \mu_*)^T \sum_k^{-1}(\max(Y_*) - \mu_*)\right)\right)/\text{sum}$$

$$\left(P\left(\max(Y_*) | X_*, \mu_*, \sum_k\right)\right)$$

Figure 7:
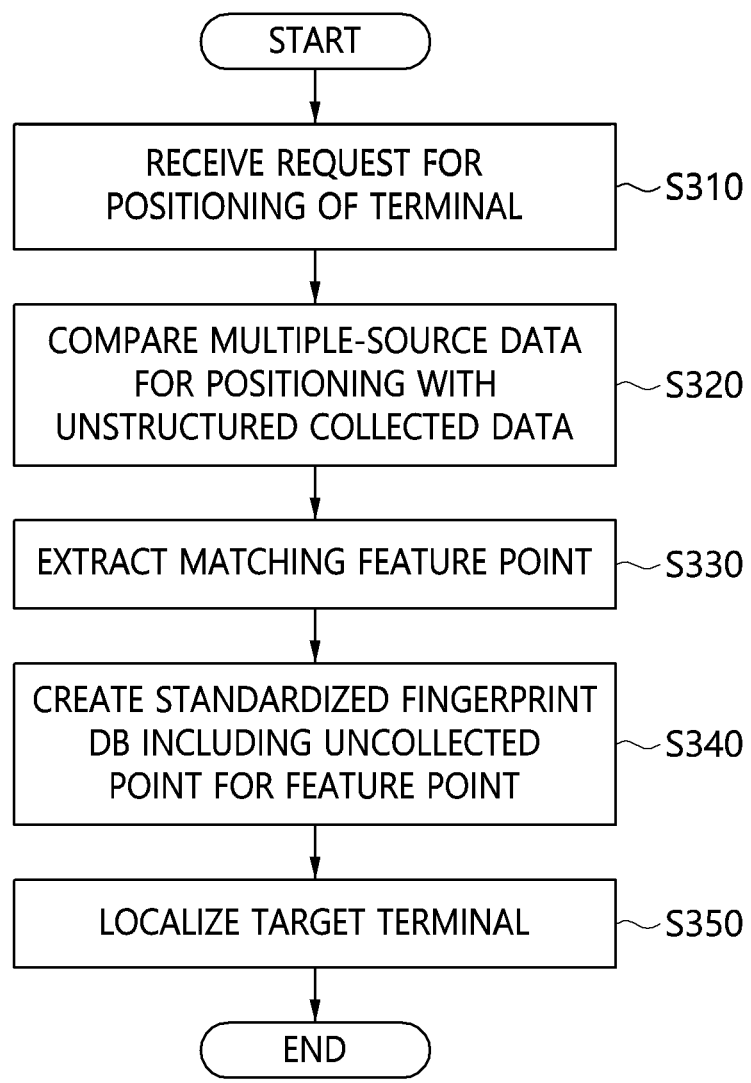
FIG. 7 is a flowchart for explaining a method for positioning of uncollected points based on machine learning using matching points of wireless communication infrastructure according to an embodiment.

FIG. 7 is a flowchart for explaining a method for positioning of uncollected points based on machine learning using matching points of wireless communication infrastructure according to an embodiment.

Referring to FIG. 7, the method for positioning of uncollected points based on machine learning using matching points of wireless communication infrastructure according to an embodiment may include extracting matching feature points by comparing collected data acquired from wireless communication infrastructure with positioning data measured by a positioning target terminal at steps S310 to S330, creating a fingerprint database of global grid cells, including uncollected points, for the extracted feature points in real time at step S340, and estimating the optimal composite location of the positioning target terminal based on the created fingerprint database at step S350.

Here, although not illustrated in the drawings, the method for positioning of uncollected points based on machine learning using matching points of wireless communication infrastructure according to an embodiment may further include parsing unstructured collected data into collection location information and first multiple-source data for positioning, storing the collection location information and the first multiple-source data for positioning in a database, and parsing second multiple-source data for positioning, which is measured by the positioning target terminal.

Accordingly, when extracting the matching feature points is performed at steps S310 to S330, the collection location information and the first multiple-source data for positioning, which are acquired as the result of parsing and stored in the database, may be used as the collected data, and the measured second multiple-source data for positioning may be used as the positioning data.

Here, the first multiple-source data for positioning and the second multiple-source data for positioning may include at least one of a post-processed file and data transmitted in real time.

Also, different parsing methods may be applied depending on the devices used for collection and on the positioning target terminal.

Here, extracting the matching feature points (S310 to S330) may include checking whether the first multiple-source data for positioning matches the second multiple-source data for positioning through a comparison therebetween at step S320, extracting one or more matching locations, each of which is a collection location at which the first multiple-source data for positioning matches the second multiple-source data for positioning, and calculating a match count in each of the extracted one or more matching locations at step S330.

Here, the multiple sources include at least one of LTE infrastructure, Wi-Fi infrastructure, and Bluetooth Low Energy (BLE) infrastructure, and extracting the matching feature points may be performed for each of the multiple sources.

Here, the matching feature point may include at least one of a match count between the collected data and the positioning data, a correlation coefficient between the collected data and the positioning data, and a combined value of the match count and the correlation coefficient.

Here, the correlation coefficient between the collected data and the positioning data may have a positive value close to 1 when the collection location and the measurement location for each positioning resource are the same as each other.

Here, the matching measured value of each positioning resource may include, for example, the received signal strength of the signal transmitted from a base station/AP, the distance from a base station/AP to the terminal, and the like.

Here, the match count for each positioning resource is proportional to the discrimination capability of the correlation coefficient, and extracting the matching feature points may be configured to extract the matching feature points by additionally using the difference between the correlation coefficients at two matching feature points having the same match count. Accordingly, a more accurate matching point may be found.

Here, creating the fingerprint database of the global grid cells in real time at step S340 may include creating global grid cells based on the matching locations and the match count in each of the matching locations, estimating the matching points in the global grid cells based on a machine-learning regression algorithm, normalizing the estimated matching points in the global grid cell, and converting the same to a matching probability density function.

Here, the machine-learning regression algorithm may use a Gaussian Process Regression (GPR) algorithm.

Here, the multiple sources include at least one of LTE infrastructure, Wi-Fi infrastructure, and Bluetooth Low Energy (BLE) infrastructure, and converting to the matching probability density function may be performed for each of the multiple sources.

Here, estimating the optimal composite location at step S350 may be configured to calculate an estimated location at which the composite probability that the positioning target terminal is present is maximized when the maximum match count between the collected data and the positioning data is given.

Figure 8:
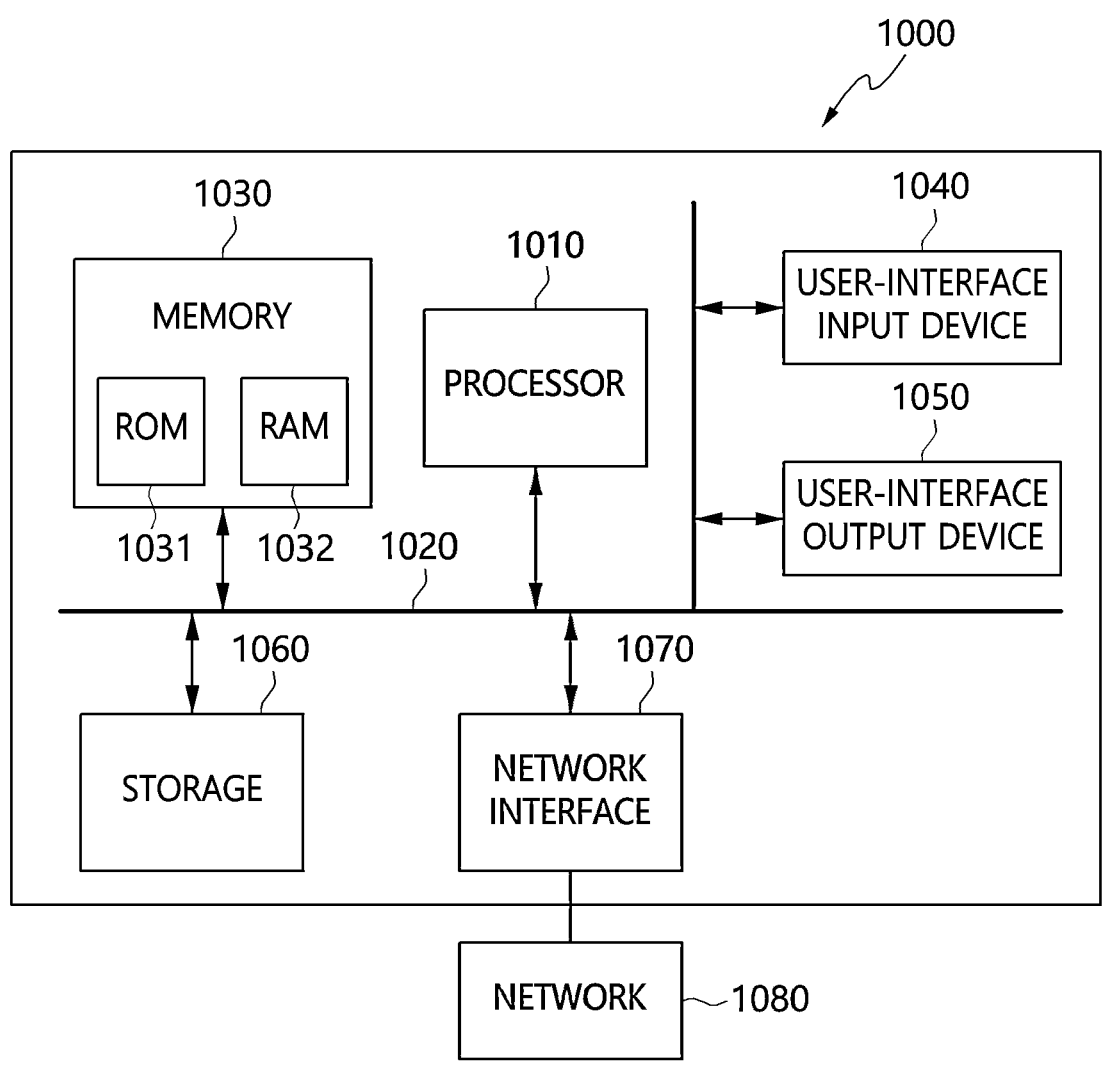
FIG. 8 is a view illustrating a computer system configuration according to an embodiment.

FIG. 8 is a view illustrating a computer system configuration according to an embodiment.

The apparatus for positioning of uncollected points based on machine learning using matching points of wireless communication infrastructure according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected with a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a nonvolatile medium, a detachable medium, a non-detachable medium, a communication medium, and an information delivery medium. For example, the memory 1030 may include ROM 1031 or RAM 1032.

According to an embodiment, a method for creation of a positioning database and positioning of uncollected points based on machine learning using matching feature points of wireless communication infrastructure is presented.

According to an embodiment, only a small amount of collected data that matches positioning data is used as input data of a machine-learning regression analysis unit, whereby the calculation time taken for the machine-learning regression analysis unit to create a real-time positioning DB may be reduced.

According to an embodiment, rather than using signal strength, matching feature points between collected data and positioning data of positioning infrastructure are used as feature points for positioning, whereby positioning performance may be provided independently of a reception signal strength error.

According to an embodiment, the final output value of a positioning DB is represented as a matching probability density function in a grid for each positioning resource, whereby data from multiple available positioning resources, included in the positioning data, may be easily combined and used to estimate an optimal composite location.

Although embodiments of the present invention have been described with reference to the accompanying drawings, those skilled in the art will appreciate that the present invention may be practiced in other specific forms without changing the technical spirit or essential features of the present invention. Therefore, the embodiments described above are illustrative in all aspects and should not be understood as limiting the present invention.

What is claimed is:

1. An apparatus for positioning of uncollected points based on machine learning using matching points of wireless communication infrastructure, comprising:
   memory in which at least one program is recorded; and
   a processor for executing the program,
   wherein the program performs
   comparing collected data acquired from wireless communication infrastructure with positioning data measured by a positioning target terminal and thereby extracting matching feature points,
   creating a fingerprint database of global grid cells, including uncollected points, for the extracted feature points in real time, and
   estimating an optimal composite location of the positioning target terminal based on the created fingerprint database, wherein:
   the program further performs
   parsing unstructured collected data into collection location information and first multiple-source data for positioning;
   storing the collection location information and the first multiple-source data for positioning in a database; and
   parsing second multiple-source data for positioning measured by the positioning target terminal, and
   extracting the matching feature points is configured to use the collection location information and the first multiple-source data for positioning, which are stored in the database, as the collected data and to use the measured second multiple-source data for positioning as the positioning data.

2. The apparatus of claim 1, wherein the first multiple-source data for positioning and the second multiple-source data for positioning are capable of including at least one of a post-processed file and data transmitted in real time.

3. The apparatus of claim 1, wherein extracting the matching feature points comprises:
checking whether the first multiple-source data for positioning matches the second multiple-source data for positioning through a comparison therebetween;
extracting one or more matching locations, each of which is a collection location at which the first multiple-source data for positioning matches the second multiple-source data for positioning; and
calculating a match count in each of the extracted one or more matching locations.

4. The apparatus of claim 3, wherein extracting the matching feature points is performed for each positioning resource including at least one of LTE infrastructure, Wi-Fi infrastructure, and Bluetooth Low Energy (BLE) infrastructure.

5. The apparatus of claim 3, wherein the matching feature points include at least one of a match count between the collected data and the positioning data, a correlation coefficient between the collected data and the positioning data, and a combined value of the match count and the correlation coefficient.

6. The apparatus of claim 5, wherein the correlation coefficient between the collected data and the positioning data has a positive value close to 1 when a collection location and a measurement location of each positioning resource are identical to each other.

7. The apparatus of claim 5, wherein:
a match count for each positioning resource is proportional to discrimination capability of the correlation coefficient, and
extracting the matching feature points is configured to extract the match count by additionally using a difference between the correlation coefficients of two matching feature points having an identical match count.

8. The apparatus of claim 5, wherein creating the fingerprint database of the global grid cells in real time comprises:
creating the global grid cells based on the matching location and the matching point in each of the matching locations;
estimating the matching point in the global grid cell based on a machine-learning regression algorithm; and
normalizing the estimated matching point in the global grid cell and performing conversion to a matching probability density function.

9. The apparatus of claim 8, wherein the machine-learning regression algorithm uses a Gaussian Process Regression (GPR) algorithm.

10. The apparatus of claim 8, wherein the conversion to the matching probability density function is performed for each positioning resource including at least one of LTE infrastructure, Wi-Fi infrastructure, and Bluetooth Low Energy (BLE) infrastructure.

11. The apparatus of claim 1, wherein estimating the optimal composite location is configured to calculate an estimated location at which a composite probability that the positioning target terminal is present is maximized when a maximum match count between the collected data and the positioning data is given.

12. A method for positioning of uncollected points based on machine learning using matching points of wireless communication infrastructure, comprising:
comparing collected data acquired from wireless communication infrastructure with positioning data measured by a positioning target terminal and thereby extracting matching feature points;
creating a fingerprint database of global grid cells, including uncollected points, for the extracted feature points in real time; and
estimating an optimal composite location of the positioning target terminal based on the created fingerprint database,
wherein the method further comprising:
parsing unstructured collected data into collection location information and first multiple-source data for positioning:
storing the collection location information and the first multiple-source data for positioning in a database; and
parsing second multiple-source data for positioning measured by the positioning target terminal,
wherein extracting the matching feature points is configured to use the collection location information and the first multiple-source data for positioning, which are stored in the database, as the collected data and to use the measured second multiple-source data for positioning as the positioning data.

13. The method of claim 12, wherein extracting the matching feature points comprises:
checking whether the first multiple-source data for positioning matches the second multiple-source data for positioning through a comparison therebetween;
extracting one or more matching locations, each of which is a collection location at which the first multiple-source data for positioning matches the second multiple-source data for positioning; and
calculating a match count in each of the extracted one or more matching locations.

14. The method of claim 13, wherein extracting the matching feature points is performed for each positioning resource including at least one of LTE infrastructure, Wi-Fi infrastructure, and Bluetooth Low Energy (BLE) infrastructure.

15. The method of claim 14, wherein creating the fingerprint database of the global grid cells in real time comprises:
creating the global grid cells based on the matching locations and the match count in each of the matching locations;
estimating the match count in the global grid cell based on a machine-learning regression algorithm; and
normalizing the estimated match count in the global grid cell and performing conversion to a matching probability density function.

16. The method of claim 12, wherein the matching feature points include at least one of a match count between the collected data and the positioning data, a correlation coefficient between the collected data and the positioning data, and a combined value of the match count and the correlation coefficient.

17. A method for creating a database of uncollected points based on machine learning using matching points of wireless communication infrastructure, comprising:
comparing collected data acquired from wireless communication infrastructure with positioning data measured by a positioning target terminal and thereby extracting matching feature points; and creating a fingerprint database of global grid cells, including uncollected points, for the extracted feature points in real time, wherein the method further comprising:

parsing unstructured collected data into collection location information and first multiple-source data for positioning;

storing the collection location information and the first multiple-source data for positioning in a database; and parsing second multiple-source data for positioning measured by the positioning target terminal, wherein extracting the matching feature points is configured to use the collection location information and the first multiple-source data for positioning, which are stored in the database, as the collected data and to use the measured second multiple-source data for positioning as the positioning data.

* * * * *